(No Model.)
W. A. DONNELL.
REVOLVING HORSE HAY RAKE.
No. 325,511. Patented Sept. 1, 1885.
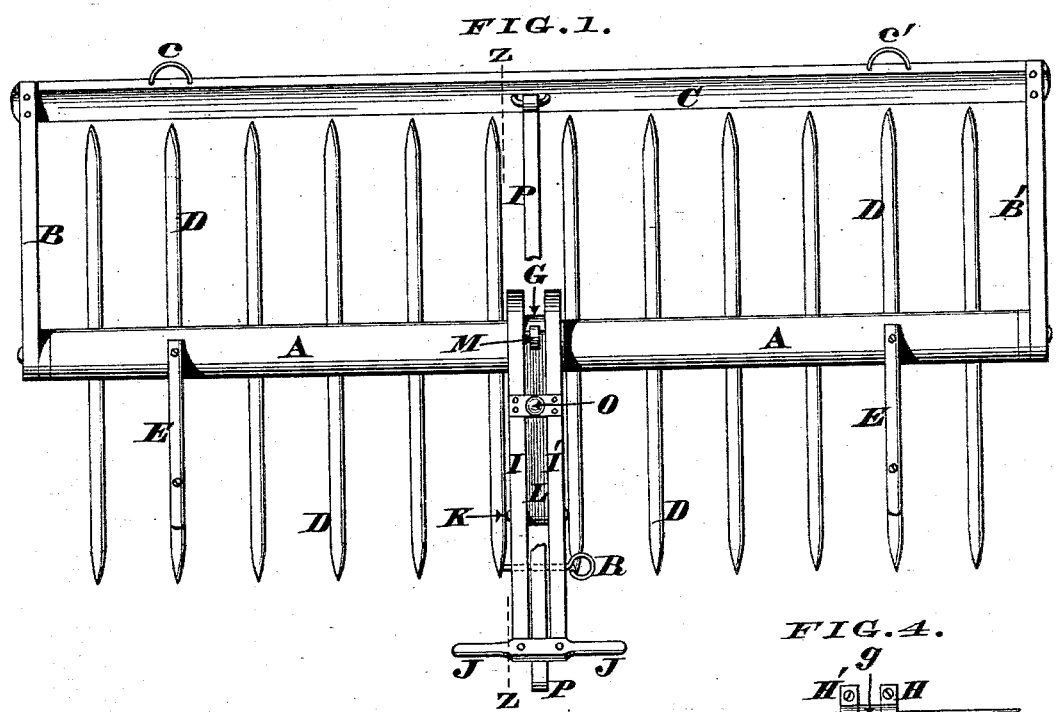
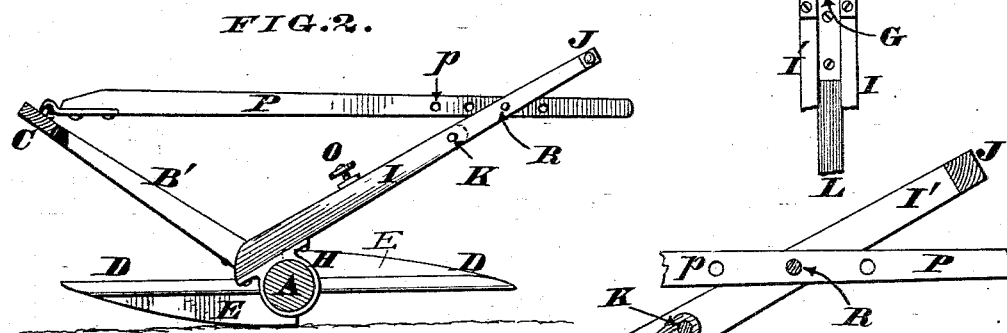
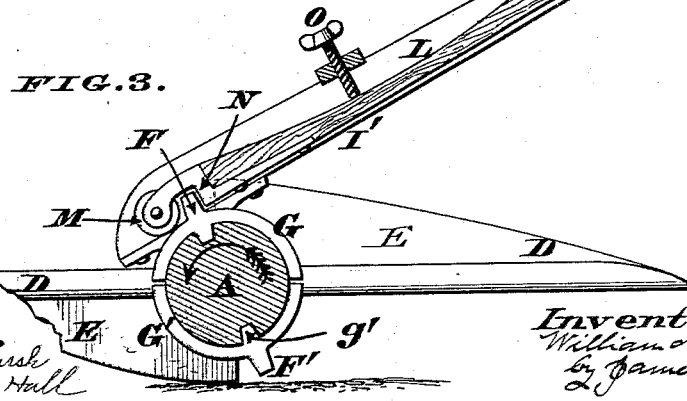
Attest.
Frank Marsh
Ida J. Hall
Inventor.
William A. Donnell
by James K. Layman
atty.

UNITED STATES PATENT OFFICE.

WILLIAM A. DONNELL, OF GREENSBURG, INDIANA.

REVOLVING HORSE HAY-RAKE.

SPECIFICATION forming part of Letters Patent No. 325,511, dated September 1, 1885.

Application filed September 22, 1884. (No model.)

*To all whom it may concern:*

Be it known that I, WILLIAM A. DONNELL, a citizen of the United States, residing at Greensburg, in the county of Decatur and State of Indiana, have invented certain new and useful Improvements in Revolving Horse Hay-Rakes, of which the following is a specification, reference being had therein to the accompanying drawings.

This invention relates to those revolving horse hay-rakes in which the head of the implement rests on the ground while the load is being collected, the dumping action being effected by the driver or other attendant, who walks behind the rake; and my improvement comprises a novel combination of devices for accomplishing this discharge of the load. Said combination includes a spring-lever that has at its front end a roller and shoulder, while the upper and rear end of said spring-lever is hung on a pivot or shaft passing transversely through two handles or stilts, the lower ends of the latter being attached to boxes within which the rake-head is adapted to revolve freely. Projecting radially from said head, and situated between these boxes, are two lugs, pins, or stumps, either one of which is adapted to bear against the roller of the aforesaid limber lever while the load is being collected; but when it is desired to dump the load the handles are elevated, thereby forcing the shoulder against the upper one of said pins, which act revolves the rake-head sufficiently to cause the pointed ends of the front teeth to come in contact with the ground. This contact of the teeth insures the complete revolution of said head, because the upper lug now escapes under the roller at the free end of the spring-lever, the latter yielding or bending sufficiently to allow such an escapement to take place, as hereinafter more fully described, and pointed out in the claim.

In the annexed drawings, Figure 1 is a plan of a revolving horse hay-rake embodying my improvements. Fig. 2 is a transverse section of the same, taken at the line $z\ z$. Fig. 3 is an enlarged transverse section taken in the plane of the spring-lever. Fig. 4 is a plan of the under side of the hay-rake, showing the connections of the handles, &c.

The rake-head A is journaled in the rear ends of the side frames, B B', to which latter is fastened the draft-bar C, having suitable provisions, $c\ c'$, for attaching the horse or other animal that is to draw the implement over the ground. The head A is armed with customary teeth or tines, D, and, if desired, with runners E, although the latter are generally omitted.

Projecting radially from the rake-head, and practically at the mid-length of the same, are two diametrically-opposite lugs, pins, or stumps, F F', of any desired length. These pins or lugs may be simply driven into the rake-head, but I prefer making them integral with half-rings or semi-collars G G', which are screwed or bolted to said head, one of the screws being shown at $g$ in Fig. 4. By this arrangement a new lug can be readily applied in case an old one should break off or become otherwise impaired.

Adapted to fit up snugly against the outer sides of the rings or collars G G' are boxes H H', within which the head A revolves with perfect freedom, said boxes having attached to them the lower ends of a pair of stilts, I I', whose upper ends are united by means of the handle J. Interposed between these stilts and hung upon a bar or pivot, K, is a spring-lever, L, within the free end of which is journaled a small roller, M, a suitable shoulder, bearing, or stop, N, being provided in the rear of said roller. Furthermore, a sufficient interval or space is left between this roller and shoulder to receive either of the lugs F or F'.

O is a temper-screw wherewith the spring-lever L is regulated to suit circumstances.

P is a tie connecting the handles I I' with the draft-bar C, said tie having near its rear end a series of perforations, $p$, to receive a pin, R, by which arrangement said handles can be maintained at a greater or less angle to regulate the pitch of the teeth D D.

The operation of the implement is as follows: The pin R of the tie-bar P is first inserted in either of the holes $p$ to regulate the pitch or inclination of the teeth, and the rake is then drawn across the hay-field. Now while the implement is engaged in collecting the load on the front teeth the pressure is necessarily forward, thereby causing the lug F to bear against the roller M, so as to lock the head A and prevent it revolving. As soon, however, as it is desired to discharged the accumulated hay, the handles I I' are elevated sufficiently to force the shoulder N against the rear side of lug F and cause the head A to turn a slight distance within the boxes H H'. This slight revolution of the head is for the purpose of causing the pointed ends of the front teeth to come in contact with the ground, and thereby complete the turning over of the rake, and the consequent dumping of the load, the direction of rotation being indicated by the arrow in Fig. 3. This complete revolution is accomplished because the lug F escapes under the roller M, the lever L springing far enough to permit this movement to take place. After the load has been dumped the head continues to revolve until the other lug, F', engages in with the interval or space between the roller M and shoulder N. To do this the lug F' raises the free end of lever L, and at the proper moment the latter flies back and snaps over said lug, thereby locking the head in place until it is again desired to dump the load, when the above-described operations are repeated. As soon as the lug F escapes from behind the roller M, the periphery of the collars G G' serves as a track for said roller to ride upon until the other lug, F', engages with the spring-lever L. Owing to this riding of the roller upon the periphery of the collars the least possible friction is generated in the working parts of the rake-head, and on this account the wear and tear of the implement is materially reduced.

Finally, the semi-collars G G' may have inwardly-projecting flanges g', adapted to enter suitable mortises or grooves in the rake-head A, and thereby prevent too much strain being thrown on the screws g.

I claim as my invention—

The combination, in a revolving horse hay-rake, of the head A D, lugs F F', collars G G', handles I I', and spring-lever L, which lever is provided at its free end with a roller, M, and shoulder N, the location of the collars G G' being such as to cause their peripheries to serve as a track for the roller M to ride upon when said head A D revolves, as herein described.

In testimony whereof I affix my signature in presence of two witnesses.

WILLIAM A. DONNELL.

Witnesses:
WILL CUMBACK, Jr.,
EDWARD SPEER.